United States Patent
Maalman et al.

(10) Patent No.: US 10,590,521 B2
(45) Date of Patent: *Mar. 17, 2020

(54) STEEL SHEET WITH HOT DIP GALVANIZED ZINC ALLOY COATING

(71) Applicant: TATA STEEL IJMUIDEN B.V., Ijmuiden (NL)

(72) Inventors: Theodorus Franciscus Jozef Maalman, Uitgeest (NL); Robert Bleeker, Beverwijk (NL); Margot Julia Vlot, Leiden (NL)

(73) Assignee: TATA STEEL IJMUIDEN B.V., Ijmuiden (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,667

(22) Filed: May 3, 2017

(65) Prior Publication Data
US 2017/0233859 A1 Aug. 17, 2017

Related U.S. Application Data

(63) Continuation of application No. 14/308,099, filed on Jun. 18, 2014, now Pat. No. 9,677,164, which is a continuation of application No. 11/571,221, filed as application No. PCT/EP2005/006873 on Jun. 23, 2005, now Pat. No. 8,785,000.

(30) Foreign Application Priority Data

Jun. 29, 2004 (EP) ..................... 04076869
Jul. 28, 2004 (EP) ..................... 04077168

(51) Int. Cl.
| | | |
|---|---|---|
| C23C 2/06 | (2006.01) | |
| C23C 2/20 | (2006.01) | |
| C23C 2/40 | (2006.01) | |
| C23C 2/34 | (2006.01) | |
| C23C 2/00 | (2006.01) | |
| C22C 18/00 | (2006.01) | |
| C22C 18/04 | (2006.01) | |
| B32B 15/01 | (2006.01) | |
| B32B 15/18 | (2006.01) | |
| B32B 15/20 | (2006.01) | |
| B32B 15/04 | (2006.01) | |
| C23C 2/02 | (2006.01) | |
| C23C 2/04 | (2006.01) | |

(52) U.S. Cl.
CPC ............. *C23C 2/06* (2013.01); *B32B 15/01* (2013.01); *B32B 15/013* (2013.01); *B32B 15/04* (2013.01); *B32B 15/043* (2013.01); *B32B 15/18* (2013.01); *B32B 15/20* (2013.01); *C22C 18/00* (2013.01); *C22C 18/04* (2013.01); *C23C 2/00* (2013.01); *C23C 2/02* (2013.01); *C23C 2/04* (2013.01); *C23C 2/20* (2013.01); *C23C 2/34* (2013.01); *C23C 2/40* (2013.01);

*Y10T 428/12792* (2015.01); *Y10T 428/12799* (2015.01); *Y10T 428/12951* (2015.01); *Y10T 428/12972* (2015.01); *Y10T 428/12979* (2015.01); *Y10T 428/263* (2015.01); *Y10T 428/264* (2015.01); *Y10T 428/265* (2015.01)

(58) Field of Classification Search
CPC .... C23C 2/06; C23C 2/40; C23C 2/34; C23C 2/00; C23C 2/02; C23C 2/04; C23C 2/20; B32B 15/013; B32B 15/01; B32B 15/18; B32B 15/20; B32B 15/04; B32B 15/043; Y10T 428/12792; Y10T 428/265; Y10T 428/12799; Y10T 428/12951; Y10T 428/12972; Y10T 428/12979; Y10T 428/264; Y10T 428/263; C22C 18/00; C22C 18/04

See application file for complete search history.

(56) References Cited

U.S. PATENT DOCUMENTS

| | | | |
|---|---|---|---|
| 6,235,410 B1 | 5/2001 | Komatsu et al. | |
| 6,379,820 B1 | 4/2002 | Komatsu et al. | |
| 6,610,423 B2 * | 8/2003 | Sugimaru | C23C 2/02 148/533 |
| 8,785,000 B2 * | 7/2014 | Maalman | C23C 2/06 148/533 |
| 9,677,164 B2 * | 6/2017 | Maalman | C23C 2/06 |

FOREIGN PATENT DOCUMENTS

| | | |
|---|---|---|
| EP | 0594520 | 4/1994 |
| EP | 365682 B1 | 8/1995 |
| EP | 0905270 | 3/1999 |
| GB | 2110248 | 6/1983 |

(Continued)

OTHER PUBLICATIONS

Derwent No. 2002-672516, "Corrosion Resistant Zinc Plating Bath and Products", 2002.

(Continued)

*Primary Examiner* — Michael E. La Villa

(74) *Attorney, Agent, or Firm* — Vorys, Sater, Seymour and Pease LLP

(57) ABSTRACT

Steel strip provided with a hot dip galvanized zinc alloy coating layer, in which the coating of the steel strip is carried out in a bath of molten zinc alloy, the zinc alloy in the coating of: 0.3-2.3 weight % magnesium; 0.6-2.3 weight % aluminium; optional <0.2 weight % of one or more additional elements; unavoidable impurities; the remainder being zinc in which the zinc alloy coating layer has a thickness of 3-12 μm.

20 Claims, No Drawings

(56) References Cited

FOREIGN PATENT DOCUMENTS

| | | |
|---|---|---|
| JP | 58-189363 A | 5/1983 |
| JP | 09-143657 A2 | 6/1997 |
| JP | 2000064010 | 2/2000 |
| JP | 2002285311 | 10/2002 |
| JP | 2002371345 A | 11/2002 |
| JP | 2002371342 | 12/2002 |
| JP | 2003138359 | 5/2003 |
| JP | 2004019000 | 1/2004 |
| JP | 2004068075 | 3/2004 |
| JP | 2004244650 A | 9/2004 |
| JP | 2005082834 A | 3/2005 |

OTHER PUBLICATIONS

Translation of JP2002-285311A to Takebashi, published Oct. 3, 2002.
Decision of Jun. 14, 2010 of EPO Examining Board for EP patent application No. 05758026.8.
Machine Translation of EP0594520 A1 to Dauzat et al., published Apr. 27, 1994.
English Translation of EP patent application No. 0594520 to Dauzat, published Apr. 27, 1994.
STIC Search provided by the USPTO on Oct. 9, 2015, 109 pages.

* cited by examiner

STEEL SHEET WITH HOT DIP GALVANIZED ZINC ALLOY COATING

CROSS-REFERENCE TO RELATED APPLICATION

This application is a continuation of U.S. patent application Ser. No. 14/308,099, filed Jun. 18, 2014, which is a continuation of U.S. patent application Ser. No. 11/571,221, filed Jul. 7, 2009, now U.S. Pat. No. 8,785,000, which is a § 371 National Stage Application of International Application No. PCT/EP2005/006873, filed on 23 Jun. 2005, claiming the priority of European Patent Application No. 04076869.9 filed on 29 Jun. 2004 and European Patent Application No. 04077168.5 filed on 28 Jul. 2004.

The invention relates to a steel strip provided with a hot dip galvanized zinc alloy coating layer and to a process for hot dip galvanising a steel strip with a zinc alloy coating layer, in which the coating of the steel strip is carried out in a bath of molten zinc alloy.

To provide a steel strip with a zinc coating is well known, especially for automotive and building applications. To get a thin layer of zinc on a steel strip in a cheap way, it is normal practice to coat the steel strip by hot dip galvanizing, in which the strip is moved through a bath of molten zinc. The molten zinc adheres to the steel, and at the departure of the strip from the bath in most cases the surplus of zinc is removed from the strip to get a thin coating layer, usually using gas knives.

It is known in the art to add certain chemical elements to the bath to improve the quality of the zinc coating and/or to improve the process of coating the steel strip. As elements often aluminium and magnesium are chosen.

European patent 0 594 520 mentions the use of 1 to 3.5 weight % magnesium and 0.5 to 1.5% aluminium, together with the addition of silicon to a percentage of 0.0010 to 0.0060 in weight %. The silicon has been added in such a small quantity to improve the quality of the zinc coating, which had been found to comprise zones where no zinc had been present (bare spots). However, the only example in the patent mentions a zinc coated steel in which the coating has the composition 2.55 weight % magnesium, 0.93 weight % aluminium, 60 ppm silicon, rest zinc and inevitable impurities.

It is an object of the invention to provide a zinc alloy coated steel strip having improved properties and a method for producing the same.

It is another object of the invention to provide a zinc alloy coated steel strip that is cheaper to produce than the known coated steel strip with the same or better properties.

It is still another object of the invention to provide a zinc alloy coated steel strip having a better corrosion resistance while maintaining or even improving other properties of the coated steel strip.

It is yet another object of the invention to provide a process that has a lower dross formation in the zinc bath.

According to the invention, one or more of these objects is reached with a steel strip provided with a hot dip galvanized zinc alloy coating layer, characterized in that the zinc alloy consists of:
  0.3-2.3 weight % magnesium;
  0.6-2.3 weight % aluminium;
  optional <0.2 weight % of one or more additional elements;
  unavoidable impurities;
  the remainder being zinc;
in which the zinc alloy coating layer has a thickness of 3-12 µm.

It has been found that high magnesium levels lead to excessive oxidic dross formation on the zinc bath and to brittle coatings. Therefore, the magnesium level has been limited to a maximum of 2.3 weight %. A minimum of 0.3 weight % magnesium is necessary to have a sufficient high corrosion resistance; magnesium additions improve the corrosion resistance of the coated strip. The magnesium level of 0.3-2.3 weight % is high enough to obtain a corrosion protection against red rust that is far higher than the corrosion protection of conventional galvanized strip.

Aluminium has been added to reduce dross formation on the bath. In combination with magnesium it also improves the corrosion resistance of the coated strip. Aluminium moreover improves the formability of the coated strip material, meaning that the adhesion of the coating on the strip is good when the strip is for instance bended. Since increased aluminium levels will deteriorate the weldability, the aluminium level has been limited to a maximum of 2.3 weight %.

An optional element that could be added in a small amount, less than 0.2 weight %, could be Pb or Sb, Ti, Ca, Mn, Sn, La, Ce, Cr, Ni, Zr or Bi, Pb, Sn, Bi and Sb are usually added to form spangles. These small amounts of an additional element do not alter the properties of the coating nor the bath to any significant extent for the usual applications.

A further advantage of the zinc alloy coated steel strip according to the invention is that the galling behaviour is better than the galling behaviour of conventional galvanized strip material.

The thickness of the zinc alloy coating layer has been limited to 3-12 µm because it has been found that thicker coatings are not necessary for most applications. It has been found that the corrosion resistance of the zinc alloy coating layer according to the invention has been improved to such an extent in comparison with the conventional galvanized coating layer that a thickness of at most 12 µm is sufficient for almost all applications. Moreover, it has been found that for laser welding two sheets of steel with the coating layer according to the invention, without a spacer between the overlapping sheets, the coating layer should preferably be thin to get a good weld.

According to a preferred embodiment, the zinc alloy coating layer has a thickness of 3-10 µm. This is a preferred thickness range for automotive applications, in view of the corrosion resistance achieved by the zinc alloy coating according to the invention.

According to a further preferred embodiment, the zinc alloy coating layer has a thickness of 3-8 µm. This thickness is preferred when improved laser welds which are produced without a spacer are of importance.

More preferably, the zinc alloy coating layer has a thickness of 3-7 µm. It has been found that the laser welds with the steel provided with the coating layer according to the invention made without spacers are better than the laser welds produced with conventional galvanized coated material. Of course, thinner coatings are also less expensive than thicker coatings in view of the amount of zinc alloy used.

Preferably, when one or more additional elements are present in the zinc alloy coating, each is present in an amount<0.02 weight %, preferably each is present in an amount<0.01 weight %. Since additional elements do not change the corrosion resistance to a significant extent as compared to the addition of magnesium and aluminium, and additional elements make the coated steel strip more costly.

Additional elements are usually only added to prevent dross forming in the bath with molten zinc alloy for the hot dip galvanising, or to form spangles in the coating layer. The additional elements are thus kept as low as possible.

According to a preferred embodiment, the silicon content in the zinc alloy layer is below 0.0010 weight %. In the composition mentioned in European patent 0 594 520 silicon has been added to prevent bare spots in the zinc alloy layer. Surprisingly, the inventors have found that for lower aluminium and magnesium contents then mentioned in the example of EP 0 594 520, it is not necessary to add silicon to the zinc alloy to prevent bare spots. This is advantageous, since it is difficult to keep the silicon content between 10 and 60 ppm when silicon has to be added, especially since silicon is present as an impurity.

According to a preferred embodiment, the steel strip has been provided with a hot dip galvanized zinc alloy coating layer in which the zinc alloy contains 1.6-2.3 weight % magnesium and 1.6-2.3 weight % aluminium. This is a preferred embodiment, because at these values the corrosion protection of the coating is at a maximum, and the corrosion protection is not influenced by small compositional variations. Above 2.3 weight % magnesium and aluminium, the coating becomes rather expensive and coating may become brittle and the surface quality of the coating may decrease.

On the other hand, another preferred embodiment of the steel strip has been provided with a hot dip galvanized zinc alloy coating layer in which the zinc alloy contains 0.6-1.3 weight % aluminium and/or 0.3-1.3 weight % magnesium. With these smaller amounts of aluminium and magnesium, no major modifications of the conventional hot dipped galvanising bath and apparatus are needed, whereas magnesium at levels between 0.3 and 1.3 weight % improves the corrosion resistance considerably. Usually, for these amounts of magnesium more than 0.5 weight % of aluminium has to be added to prevent that more oxidic dross is formed on the bath than for conventional baths; dross can lead to defects in the coating. The coatings with these amounts of magnesium and aluminium are optimal for applications with high demands on surface quality and improved corrosion resistance.

Preferably, the zinc alloy contains 0.8-1.2 weight % aluminium and/or 0.8-1.2 weight % magnesium. These amounts of magnesium and aluminium are optimal to provide a coating with both a high corrosion resistance, an excellent surface quality, an excellent formability, and a good weldability at limited extra costs as compared to conventional hot dipped galvanising.

According to a preferred embodiment, the steel strip has been provided with a hot dip galvanized zinc alloy coating layer in which the amount of aluminium in weight % is the same as the amount of magnesium in weight % plus or minus a maximum of 0.3 weight %. It has been found that the dross formed on the bath is suppressed to a considerable level when the amount of aluminium equals or almost equals the amount of magnesium.

The invention also relates to a process for hot dip galvanising a steel strip with a zinc alloy coating layer, in which the coating of the steel strip is carried out in a bath of molten zinc alloy, wherein the zinc alloy consists of:
  0.3-2.3 weight % magnesium;
  0.5-2.3 weight % aluminium;
  less than 0.0010 weight % of silicon;
  optional <0.2 weight % of one or more additional elements;
  unavoidable impurities;
  the remainder being zinc.

With this process it is possible to produce the steel strip as discussed above, using the conventional hot dip galvanising equipment. Usually, the amount of aluminium in the coating is slightly higher than the amount of aluminium in the bath. The advantages of the process are mentioned when discussing the steel strip according to the invention.

According to a preferred process, the zinc alloy bath contains 1.5-2.3 weight % magnesium and 1.5-2.3 weight % aluminium, as discussed above for the steel strip.

According to another preferred process, the zinc alloy bath contains 0.6-1.3 weight % aluminium and/or 0.3-1.3 weight % magnesium, as discussed above.

Preferably, the zinc alloy bath contains 0.7-1.2 weight % aluminium and/or 0.7-1.2 weight % magnesium, as discussed above.

According to a preferred embodiment of the process, the temperature of the bath of molten zinc is kept between 380° C. and 550° C., preferably between 420° C. and 480° C. The melting point of pure zinc is 419° C., and with 3.2% Al and 3.3% Mg the melting temperature is about 337° C., so 380° C. is a reasonable lower limit to avoid local solidification. A lower limit of 440° C. is absolutely safe to avoid any solidification. Increasing the zinc bath temperature increases the zinc evaporation and leads to dust formation in the galvanising line, giving rise to surface defects. The upper limit should thus be reasonably low, for which 550° C. is fair, and preferably 480° C. as a technically possible upper limit.

Preferably the temperature of the steel strip before entering the bath of molten zinc alloy is between 380° C. and 850° C., more preferably between the temperature of the bath of molten zinc alloy and 25° C. above the bath temperature. The temperature of the steel strip should not be lower than the melting point of the zinc alloy to avoid local solidification of the zinc bath. High steel strip temperatures will lead to higher evaporation of the zinc, resulting in dust formation. High steel strip temperatures can also heat up the zinc bath, requiring continuous cooling of the zinc in the bath, which is expensive. For these reasons a temperature of the steel strip just above the bath temperature is preferred.

According to a preferred embodiment, the steel strip enters the bath of molten zinc alloy having a speed higher than 9 metres per minute, preferably a speed higher than 15 metres per minute, more preferably having a speed higher than 30 metres per minute. It has been found that for coating speeds lower than 9 metres per minute, sagging often occurs, resulting in the zinc alloy coating showing a surface waviness. With speeds above 9 metres per minute, the number of examples showing sagging is reduced, and for coating speeds higher than 15 metres per minute and 30 metres per minute these numbers are even more reduced.

The invention also relates to a steel strip provided with a hot dip galvanized zinc alloy coating produced with the above mentioned method.

The invention furthermore relates to an automotive part manufactured from a steel strip as described above.

The invention will be elucidated hereinafter, in which some experiments are described and some test results are given.

First, the test results are given in the following eight tables.

TABLE 1 composition of bath and coating

| Ref# | Bath Al % | Bath Mg % | Coating g/m2 | Coating Al % | Coating Mg % | Coating Fe % |
|---|---|---|---|---|---|---|
| 1 | 0.2 | 0.5 | 99 | 0.4 | 0.5 | |
| 2 | 0.8 | 0.9 | | 1.0 | 0.8 | 0.11 |
| 3 | 1.0 | 0.9 | | 1.1 | 0.9 | 0.18 |
| 4 | 1.0 | 1.0 | | 1.2 | 1.0 | 0.14 |
| 5 | 1.9 | 1.0 | | 2.0 | 0.9 | 0.07 |
| 6 | 1.1 | 1.1 | 42 | 1.3 | 0.9 | 0.29 |
| 7 | 1.2 | 1.2 | | 1.4 | 1.2 | 0.15 |
| 8 | 1.5 | 1.5 | | 1.6 | 1.4 | 0.14 |
| 9 | 0.9 | 1.6 | | 1.1 | 1.6 | 0.26 |
| 10 | 1.7 | 1.7 | | 1.9 | 1.7 | 0.10 |
| 11 | 2.5 | 2.0 | | 2.5 | 1.8 | 0.05 |
| 12 | 1.0 | 2.1 | 77 | 1.2 | 1.8 | 0.13 |
| 13 | 1.0 | 2.1 | 39 | 1.2 | 1.8 | 0.21 |
| 14 | 2.1 | 2.1 | | 2.2 | 2.1 | 0.15 |
| 15 | 1.0 | 2.5 | | 1.1 | 2.8 | 0.06 |

TABLE 2 corrosion resistance of flat panel

| Ref# | Bath Al % | Bath Mg % | Coating thickness (μm) | Corrosion flat panel |
|---|---|---|---|---|
| 1 | 0.2 | 0.0 | 10 | 0 |
| 2 | 0.5 | 0.5 | 4 | 0 |
| 3 | 0.5 | 0.5 | 6 | + |
| 4 | 0.5 | 0.5 | 8 | ++ |
| 5 | 0.5 | 0.5 | 10 | ++ |
| 6 | 0.2 | 0.5 | 14 | + |
| 7 | 1.0 | 0.9 | 6 | ++ |
| 8 | 1.0 | 0.9 | 7 | ++ |
| 9 | 1.0 | 0.9 | 10 | ++ |
| 10 | 1.0 | 0.9 | 11 | ++ |
| 11 | 1.0 | 1.0 | 6 | + |
| 12 | 1.0 | 1.0 | 6 | ++ |
| 13 | 1.9 | 1.0 | 20 | +++ |
| 14 | 1.1 | 1.1 | 4 | +++ |
| 15 | 1.1 | 1.1 | 6 | +++ |
| 16 | 1.1 | 1.1 | 7 | +++ |
| 17 | 1.1 | 1.1 | 10 | ++++ |
| 18 | 1.1 | 1.1 | 11 | ++++ |
| 19 | 1.2 | 1.2 | 6 | ++ |
| 20 | 1.5 | 1.5 | 6 | ++++ |
| 21 | 1.7 | 1.7 | 6 | ++++ |
| 22 | 2.5 | 2.0 | 25 | ++++ |
| 23 | 1.0 | 2.1 | 5 | + |
| 24 | 1.0 | 2.1 | 6 | + |
| 25 | 1.0 | 2.1 | 10 | +++ |
| 26 | 1.0 | 2.1 | 11 | +++ |
| 27 | 2.1 | 2.1 | 6 | ++++ |

Qualification:
0 = no improvement as compared to regular HDG (0.2% Al) of 10 μm in SST
+ = improvement up to a factor 2
++ = improvement up to a factor 4
+++ = improvement up to a factor 8
++++ = improvement more than a factor 8

TABLE 3 corrosion resistance of deformed panel

| Ref# | Bath Al % | Bath Mg % | Coating thickness (μm) | Corrosion deformed panel |
|---|---|---|---|---|
| 1 | 0.2 | 0.0 | 10 | 0 |
| 2 | 1.0 | 1.0 | 6 | + |
| 3 | 1.0 | 1.0 | 6 | ++ |
| 4 | 1.0 | 1.0 | 3 | 0 |
| 5 | 1.1 | 1.1 | 13 | +++ |
| 6 | 1.2 | 1.2 | 6 | + |

TABLE 3-continued corrosion resistance of deformed panel

| Ref# | Bath Al % | Bath Mg % | Coating thickness (μm) | Corrosion deformed panel |
|---|---|---|---|---|
| 7 | 1.2 | 1.2 | 6 | ++ |
| 8 | 1.5 | 1.5 | 4 | + |
| 9 | 1.5 | 1.5 | 6 | ++ |
| 10 | 1.7 | 1.7 | 4 | ++ |
| 11 | 1.7 | 1.7 | 6 | ++ |
| 12 | 2.1 | 2.1 | 4 | ++ |
| 13 | 2.1 | 2.1 | 7 | ++ |

Qualification:
0 = no improvement as compared to regular HDG (0.2% Al) of 10 μm in SST
+ = improvement up to a factor 2
++ = improvement up to a factor 4
+++ = improvement more than a factor 4

TABLE 4 galling performance

| Ref# | Bath Al % | Bath Mg % | Coating thickness (μm) | Galling performance Cylindrical side | Galling performance Flat side |
|---|---|---|---|---|---|
| 1 | 0.2 | 0.0 | 7.0 | 5 | 4 |
| 2 | 0.2 | 0.0 | 7.0 | 5 | 4 |
| 3 | 1.0 | 0.9 | 6.3 | 1 | 1 |
| 4 | 1.0 | 0.9 | 5.2 | 1 | 1 |
| 5 | 1.2 | 1.2 | 5.9 | 1 | 1 |
| 6 | 1.2 | 1.2 | 5.9 | 1 | 1 |
| 7 | 1.5 | 1.5 | 5.9 | 1 | 1 |
| 8 | 1.5 | 1.5 | 5.5 | 1 | 1 |
| 9 | 1.7 | 1.7 | 5.6 | 1 | 1 |
| 10 | 1.7 | 1.7 | 6.4 | 1 | 1 |
| 11 | 2.1 | 2.1 | 7.5 | 1 | 1 |
| 12 | 2.1 | 2.1 | 5.1 | 1 | 1 |

Qualification:
1. Excellent (no deep scratches, homogenous surface)
2. Good (a few scratches may occur)
3. Moderate (stained or slightly scratched surface)
4. Poor (some large scratches)
5. Very poor (Heavily scratched/worn surface, material break-out)

TABLE 5 surface quality

| Ref# | Bath Al % | Bath Mg % | Coating Surface quality | Coating Formability |
|---|---|---|---|---|
| 1 | 0.2 | 0.0 | 0 | 0 |
| 2 | 0.5 | 0.5 | + | 0 |
| 3 | 0.2 | 0.5 | − | 0 |
| 4 | 0.8 | 0.9 | + | 0 |
| 5 | 1.0 | 0.9 | + | 0 |
| 6 | 1.0 | 1.0 | + | 0 |
| 7 | 1.9 | 1.0 | + | |

TABLE 5-continued surface quality

| Ref# | Bath Al % | Bath Mg % | Coating Surface quality | Coating Formability |
|---|---|---|---|---|
| 8 | 1.1 | 1.1 | + | 0 |
| 9 | 1.2 | 1.2 | + | 0 |
| 10 | 1.5 | 1.5 | + | 0 |
| 11 | 2.0 | 1.6 | + | 0 |
| 12 | 0.9 | 1.6 | + | 0 |
| 13 | 1.7 | 1.7 | + | 0 |
| 14 | 2.5 | 2.0 | − | |
| 15 | 1.0 | 2.1 | + | — |
| 16 | 2.1 | 2.1 | + | 0 |
| 17 | 1.0 | 2.5 | + | — |

Qualification: Surface quality
0 = equal to panels from a 0.2% Al-bath produced in the same way
+ = better
− = worse
Qualification: Formability
0 = no cracks present on 0T-bend
— = cracks present

TABLE 7 spot weldability

| Ref# | Bath Al % | Bath Mg % | Coating thickness (μm) | Weldability |
|---|---|---|---|---|
| 1 | 0.2 | 0.0 | 10 | 0 |
| 2 | 0.5 | 0.5 | 10 | 0 |
| 3 | 1.0 | 1.0 | 10 | 0 |

Qualification:
0 = similar welding range
− = smaller welding range
+ = larger welding range

TABLE 8 bath temperature

| Ref# | Bath Al % | Bath Mg % | Bath Temp | Bath SET | Coating thickness (μm) | Surface quality | Formability | Dross formation | Corrosion flat panel |
|---|---|---|---|---|---|---|---|---|---|
| 1 | 1.0 | 0.9 | 410 | 430 | 6 | + | 0 | + | ++ |
| 2 | 1.0 | 0.9 | 460 | 550 | 7 | + | 0 | + | ++ |
| 3 | 1.0 | 0.9 | 460 | 475 | 6 | + | 0 | + | ++ |
| 4 | 1.0 | 0.9 | 460 | 475 | 6 | + | 0 | + | ++ |
| 5 | 1.1 | 1.1 | 405 | 420 | 11 | + | 0 | + | +++ |
| 6 | 1.1 | 1.1 | 460 | 475 | 11 | + | 0 | + | +++ |
| 7 | 1.1 | 1.1 | 410 | 480 | 7 | + | 0 | + | +++ |
| 8 | 1.1 | 1.1 | 460 | 475 | 6 | + | 0 | + | +++ |

SET = strip entry temperature

TABLE 6 dross formation

| Ref# | Bath Al % | Bath Mg % | Dross formation |
|---|---|---|---|
| 1 | 0.2 | 0.0 | 0 |
| 2 | 0.5 | 0.5 | + |
| 3 | 0.2 | 0.5 | − |
| 4 | 0.8 | 0.9 | + |
| 5 | 1.0 | 0.9 | + |
| 6 | 1.0 | 1.0 | + |
| 7 | 1.9 | 1.0 | + |
| 8 | 1.1 | 1.1 | + |
| 9 | 1.2 | 1.2 | + |
| 10 | 1.5 | 1.5 | + |
| 11 | 2.0 | 1.6 | + |
| 12 | 0.9 | 1.6 | + |
| 13 | 1.7 | 1.7 | + |
| 14 | 2.5 | 2.0 | + |
| 15 | 1.0 | 2.1 | + |
| 16 | 2.1 | 2.1 | + |
| 17 | 1.0 | 2.5 | − |

Qualification:
− More oxidic dross formation than on a regular (0.2% Al) bath
0 Similar amounts of oxidic dross formation than on a regular (0.2% Al) bath
+ Less oxidic dross formation than on a regular (0.2% Al) bath The steel used for the experiments is an ultra low carbon steel having the composition (all in weight %): 0.001 C, 0.105 Mn, 0.005 P, 0.004 S, 0.005 Si, 0.028 Al, 0.025 Alzo, 0.0027 N, 0.018 Nb and 0.014 Ti, the remainder being unavoidable impurities and Fe.

The steel panels have been made from cold rolled steel and have a size of 12 by 20 cm and a thickness of 0.7 mm. After degreasing they have been subjected to the following treatment:

Step 1: in 11 seconds from room temperature to 250° C. in an atmosphere of 85.5% $N_2$, 2% 11%, 11% $CO_2$ and 1.5% CO;
Step 2: in 11 seconds from 250° C. to 670° C. in the same atmosphere as in step 1;
Step 3: in 46 seconds from 670° C. to 800° C. in an atmosphere of 85% $N_2$ and 15% $H_2$;
Step 4: in 68 seconds from 800° C. to 670° C. in the same atmosphere as in step 3;
Step 5: in 21 seconds from 670° C. to the strip entry temperature (SET), usually 475° C., in the same atmosphere as in step 3;
Step 6: dipping in liquid zinc alloy, usually at 460° C. for 2 seconds, and wiping the zinc layer on the steel panel with 100% $N_2$ to regulate the coating weight;
Step 7: cooling in 60 seconds to 80° C. in 100% $N_2$.

In some experiments the atmosphere in step 1 and 2 has been changed to 85% $N_2$ and 15% $H_2$, but no effect on the coating quality has been observed.

A Fischer Dualscope according to ISO 2178 has been used to determine the coating thickness at each side of the panel, using the average value of nine points.

In table 1, the alloy elements in the zinc bath used for coating the steel panels and the alloy elements in the coating itself are given. Usually, the amount of aluminium in the coating is slightly higher than the amount of aluminium in the bath.

In table 2 the corrosion of a flat panel (not deformed) is indicated for a large number of panels. The coating thickness varies. As can be seen, for small amount of Al and Mg the coating has to be thicker to get a better corrosion resistance. For higher amounts of Al and Mg even with a thin layer a very good corrosion resistance can be achieved. A good result can be achieved with 0.8 to 1.2 weight % Al and Mg for higher coating thicknesses; a very good result can be achieved with 1.6 to 2.3 weight % Al and Mg for thin coating layers.

The corrosion resistance has been measured using the salt spray test (ASTM-B117) to get an idea of the corrosion resistance under severe, high chloride containing, wet conditions, which represents some critical corrosive automotive as well as building microclimates.

The test has been performed in a corrosion cabinet wherein the temperature is maintained at 35° C., while a water mist containing 5% NaCl solution is continuously sprayed over the samples mounted into racks under an angle of 75°. The side of the sample to be evaluated for its corrosion behaviour is directed towards the salt spray mist. The edges of the samples are taped off to prevent possible, early red rusting at the edges disturbing proper corrosion evaluation at the surface. Once per day the samples are inspected to see if red rust is occurring. First red rust is the main criterion for the corrosion resistance of the product. Reference product is conventional hot dip galvanized steel with a 10 μm zinc coating thickness.

Table 3 shows the corrosion resistance of deformed panels. Deformation has been done by an Erichsen 8 mm cup. As can be seen, the corrosion resistance here depends to a large extend on the coating thickness of the zinc alloy layer. However, it is clear that a higher amount of the alloy elements Al and Mg results in a better corrosion resistance of the zinc alloy layer.

Table 4 shows the galling performance of the hot dip galvanised steel. All coatings for which the bath contained approximately 1 weight % Al and Mg and more show an excellent galling performance. The galling performance has been measured using the linear friction test (LFT) method. This method uses severe conditions to accelerate galling. The method uses one flat tool and one round tool to develop a high-pressure contact with the sample surface. The tool material used was in accordance with DIN 1.3343.

For each material/lubrication system, strips of 50 mm width and 300 mm length were pulled at a speed of 0.33 mm/s between the set of tools (one flat, one round) pushed together with a force of 51N. The strips were drawn through the tools ten times along a testing distance of 55 mm. After each stroke the tools were released and the strips returned to the original starting position in preparation for the next stroke. All tests were conducted at 20° C. and 50% humidity.

Visual analysis of the LFT samples was conducted to assess the extent of galling on the surface of the samples. Three people made an independent assessment of the scarred surface and the median result was recorded. Galling is ranked on a scale of 1 to 5, as defined under table 4.

Table 5 shows the surface quality and formability of a number of panels. The surface quality has been measured by visual inspection of the panels on bare spots, irregularities sticking from the surface (usually caused by dross) and the general appearance or homogeneity of gloss over the panel. As follows from the table, the surface quality is good between approximately 0.5 weight % Al and Mg and 2.1 weight % Al and Mg. With higher amounts of aluminium, the amount of dross in the bath increases, resulting in a lower surface quality. The formability of the coating has been measured by visual inspection on cracks in the coating after a full bend (OT) of the panel. With higher amounts of magnesium the formability appears to decrease.

Table 6 shows that the dross formation is less than for a conventional zinc bath when the amount of Al and Mg is between approximately 0.5 and 2.1 weight %. The dross formation has been judged quantatively as compared to the amount of foam and adhering dross measured for four bath compositions: Zn+0.2% Al, Zn+1% Al+1% Mg, Zn+1% Al+2% Mg and Zn+1% Al+3% Mg. For these four bath compositions, argon gas has been bubbled for 2.5 hours through the liquid zinc alloy in a vessel to break up the oxide film layer on the surface. After this, the foam on the surface is removed and weighed. The rest of the bath is poured into an empty vessel and the remaining dross adhering on the wall of the original vessel is also removed for weighing. This leads to the following results in Table 9:

TABLE 9

| Zinc bath | dross | |
|---|---|---|
| | Foam on surface (%)* | Adhering dross on wall (%)* |
| GI = Zn + 0.2% Al | 1.7 | 1.4 |
| Zn + 1.0% Mg + 1.0% Al | 1.1 | 1.1 |
| Zn + 2.0% Mg + 1.0% Al | 1.2 | 1.3 |
| Zn + 3.0% Mg + 1.0% Al | 15 | / |

*Measured as percentage of the total amount of liquid zinc in the vessel.

This measurement was in agreement with the observations during the dipping experiments that clearly showed less dross formation onto the zinc bath for the Zn+1% Al+1% Mg and Zn+1% Al+2% Mg composition.

Table 7 shows that only a few spot weldability tests have been performed. The weldability appears not to be influenced by the amount of Al and Mg in the zinc bath. A weld growth curve has been made by making welds with increasing welding current with electrodes of 4.6 mm in diameter and a force of 2 kN. The welding range is the difference in current just before splashing and the current to achieve a minimum plug diameter of 3.51 √t, with t the steel thickness. Table 7 shows that 0.5% and 1% Mg and Al-alloyed coated steel have a similar welding range as regular galvanized steel.

Table 8 shows that the influence of the temperature of the bath and the temperature of the strip when it enters the bath is minimal. A temperature of 410° C. or 460° C. of the bath appears to make no difference, and the same holds for a strip entry temperature of 420° C. or 475° C.

The above results can be summarised as follows: an amount of 0.3-2.3 weight % magnesium and 0.6-2.3 weight % aluminium in the coating of hot dipped galvanised strip will result in better corrosion resistance than the corrosion resistance of conventional galvanised steel. The corrosion resistance is very good when the amount of both aluminium and magnesium in the coating is between 1.6 and 2.3 weight %, even for thin coating layers. The corrosion resistance is good when the amount of both aluminium and magnesium is between 0.8 and 1.2 weight % for thin coating layers, and very good for thicker coating layers. The amounts of the alloying elements should be not too high to prevent dross formation.

Furthermore, a trial has been performed on a pilot line with two compositions of Mg and Al additions according to the invention as can be found in the following table 10:

TABLE 10 pilot line compositions

| Name composition | Al % bath | Mg % bath |
|---|---|---|
| MZ_trial1 | 0.85 | 1.05 |
| MZ_trial2 | 1.40 | 1.65 |
| MZ_trial2 (2nd sample) | 1.46 | 1.68 |

The bath contained no Si (<0.001%), but some pollutions of Cr (<0.005%) and Ni (~0.009%) due to the dissolution of stainless steel from the pot material and bath hardware (sink roll, etc.). No measurable amount of Si was found in the bath (<0.001%). Further process parameters are chosen to represent the common practice of commercial hot dip galvanising lines as closely as possible, see Table 11:

TABLE 11 process parameters

| Process parameter | Value |
|---|---|
| Steel grade | Ti-IF (=Ti-SULC) |
| Steel gauge | 0.7 mm |
| Strip width | 247 mm |
| Temperatures annealing cycle | Direct Fired Furnace preheating till 410° C. Radiant Tube Furnace at 800-820° C. (30 s) |
| Annealing cycle $H_2$ content (rest $N_2$) | 5% |
| Dewpoint in furnaces | −24° C. to −32° C. |
| Strip Entry Temperature | between 475 and 500° C. |
| Zinc bath temperature | between 455 and 460° C. |
| Wiping gas | $N_2$ |
| Knife gap | 0.6 mm |
| Line speed | 34 m/min (and another trial at 24 m/min) |

Various coils were produced with different coating thicknesses (by variation of $N_2$ pressure, temperature and knife-strip distance in the gas knives) and some resulting compositions of the coatings can be found in the following table 12:

TABLE 12 coating compositions

| # | Al % | Mg % | Fe % | Cr % | Ni % | Si % | coating weight per side (g/m²) |
|---|---|---|---|---|---|---|---|
| 1 A | 1.08 | 1.07 | 0.27 | 0.006 | <0.005 | <0.001 | 76.5 |
| 1 B | 1.14 | 1.09 | 0.32 | 0.006 | <0.005 | <0.001 | 78.3 |
| 2 A | 1.12 | 1.07 | 0.29 | 0.007 | <0.005 | <0.001 | 61.0 |
| 2 B | 1.15 | 1.07 | 0.32 | 0.007 | <0.005 | <0.001 | 62.2 |
| 3 A | 1.06 | 1.06 | 0.26 | 0.007 | <0.005 | <0.001 | 62.1 |
| 3 B | 1.16 | 1.07 | 0.39 | 0.007 | <0.005 | <0.001 | 52.4 |
| 4 A | 1.68 | 1.71 | 0.35 | 0.006 | 0.010 | <0.001 | 40.9 |
| 4 B | 1.77 | 1.76 | 0.61 | 0.008 | 0.014 | <0.001 | 33.8 |
| 5 A | 1.67 | 1.73 | 0.34 | 0.006 | 0.008 | <0.001 | 43.2 |
| 5 B | 1.71 | 1.73 | 0.45 | 0.007 | 0.010 | <0.001 | 34.5 |

Samples 1-3 were made from composition MZ_trial1, samples 4+5 from MZ_trial2. These values are obtained by dissolution of the zinc coating by pickling acid with an inhibitor and weighing the weight loss to determine the coating weight. The solution is analysed by ICP-OES (Inductively Coupled Plasma—Optical Emmission Spectroscopy). Si-contents have been determined on a separate sample, by a photometric technique.

During the production of the thicker coatings (>8 μm per side) with the MZ_trial2 bath composition, some sagging of the coating occurred that leads to a homogeneous cloudy-like pattern. These sags were heavier for higher coating weights. Lowering the line speed from 34 m/min to 24 m/min also increased the sagging pattern. To find more evidence for the relation between line speed and sagging patterns, some additional panels were produced on the lab simulator.

Experiments were performed similar to the process conditions as used for the other lab panels described previously. The bath compositions used for these experiments are 0.21% Al for galvanized material (GI) and 2.0% Al+2.0% Mg for the zinc alloy coating according to the invention (MZ), to increase the effect and study process parameters that can control it. The withdrawal speed of the panel (comparable to line speed), wiping volume (comparable to pressure of the wiping knives) and bath temperature have been varied. Thicker coatings were made to check for the sagging pattern. To test the effect of oxidation during wiping, some experiments were performed with $CO_2$ in the wiping medium. Coating thickness on the front of the panel is measured and its sagging pattern evaluated (present or not present). The results are summarised in Table 13.

As can be seen clearly from this Table 13, the GI bath also gives sagging patterns, but never for bath temperatures >490° C. (examples #2, 7, 10, 12 and 16). However, for GI a normal bath temperature is 460° C. in commercial production, and this does not lead to sagging, except for very thick coatings (>30 μm). So, the withdrawal speed in a production line must be the reason that it does not occur, which is also shown by examples 10-16 (corresponding to a line speed of 15 m/min), that give no sagging, while it does give sagging at lower line speeds (examples 1-9).

For the MZ composition, sagging patterns are found at all bath temperatures, but less frequently above 430° C., as can be seen in Table 13 (3-4 examples showed sagging patterns out of 19 examples at panels at bath temperature 460° C. and higher, while all panels at bath temperature lower than 460° C.). In combination with the commercial experience with GI, it is concluded that the bath temperature should be above 430° C. to get less chance on sagging patterns.

Withdrawal speed has also influence on the MZ composition, higher withdrawal speeds (150 mm/s=9 m/min) or higher, does give less examples of sagging (5 out of 17) than below 150 mm/s (17 out of 21). Therefore, to produce a product without sagging patterns, the line speed should be higher than 9 m/min, preferably higher than 30 m/min, as found in the pilot line trial experiments.

An explanation for the sagging patterns is the stability of the oxide film on the coating during wiping (see EP 0 905 270 B1). It was assumed that a thinner oxide would lead to less sagging problems. However, introduction of $CO_2$ in the wiping gas in addition to some $N_2$, did not change the sagging pattern formation, as can be seen by comparing example 42 and 43 to examples 48-51, that did both not lead to sagging patterns. It can also not alleviate sagging patterns, as can be seen by comparing example 18 with 22. Similarly, example 29 and 48 were repeated with air on the wipers, instead of $N_2$, leading to the same sagging behaviour. Apparently, the sagging pattern is not influenced by oxidation of the wiping gas, and air can also be a wiping medium for the Zn—Al—Mg bath compositions from this invention.

TABLE 13 experiments process parameters

| # | GI (0.21%Al) or MZ (2.0%Al + 2.0%Mg) | With-drawal speed (min/s) | wiping with $N_2$ Nl/min | Bath temperature (° C.) | wiping with $CO_2$ Nl/min | Coating thickness front (μm) | sagging pattern present (1 = yes, 0 = no) |
|---|---|---|---|---|---|---|---|
| 1 | GI | 100 | 50 | 490 | 0 | 17.6 | 1 |
| 2 | GI | 100 | 50 | 520 | 0 | 17.7 | 0 |
| 3 | GI | 100 | 100 | 460 | 0 | 13.5 | 1 |
| 4 | GI | 100 | 100 | 460 | 0 | 15 | 1 |
| 5 | GI | 100 | 100 | 490 | 0 | 9 | 1 |
| 6 | GI | 100 | 100 | 490 | 0 | 10 | 1 |
| 7 | GI | 100 | 100 | 520 | 0 | 9.2 | 0 |
| 8 | GI | 150 | 100 | 460 | 0 | 14.4 | 1 |
| 9 | GI | 150 | 100 | 460 | 0 | 15.6 | 1 |
| 10 | GI | 250 | 25 | 520 | 0 | 28 | 0 |
| 11 | GI | 250 | 50 | 490 | 0 | 19.4 | 0 |
| 12 | GI | 250 | 50 | 520 | 0 | 19.1 | 0 |
| 13 | GI | 250 | 100 | 460 | 0 | 8.5 | 0 |
| 14 | GI | 250 | 100 | 460 | 0 | 9.3 | 0 |
| 15 | GI | 250 | 100 | 490 | 0 | 8 | 0 |
| 16 | GI | 250 | 100 | 520 | 0 | 11.2 | 0 |
| 17 | MZ | 50 | 50 | 460 | 0 | 12.2 | 1 |
| 18 | MZ | 50 | 50 | 460 | 50 | 13.5 | 1 |
| 19 | MZ | 50 | 100 | 430 | 0 | 13.8 | 1 |
| 20 | MZ | 50 | 100 | 430 | 0 | 14.8 | 1 |
| 21 | MZ | 50 | 100 | 430 | 0 | 15.5 | 1 |
| 22 | MZ | 50 | 100 | 460 | 0 | 13.4 | 1 |
| 23 | MZ | 50 | 100 | 490 | 0 | 11.9 | 1 |
| 24 | MZ | 50 | 150 | 430 | 0 | 13.2 | 1 |
| 25 | MZ | 50 | 150 | 460 | 0 | 10.6 | 1 |
| 26 | MZ | 100 | 100 | 400 | 0 | 23.9 | 1 |
| 27 | MZ | 100 | 100 | 400 | 0 | 26.3 | 1 |
| 28 | MZ | 100 | 100 | 430 | 0 | 22.1 | 1 |
| 29* | MZ | 100 | 100 | 430 | 0 | 23 | 1 |
| 30 | MZ | 100 | 100 | 460 | 0 | 7.8 | 0 |
| 31 | MZ | 100 | 100 | 460 | 0 | 7.8 | 0 |
| 32 | MZ | 100 | 100 | 460 | 0 | 18.8 | 0-1 |
| 33 | MZ | 100 | 100 | 460 | 0 | 18.3 | 1 |
| 34 | MZ | 100 | 100 | 460 | 0 | 19.2 | 1 |
| 35 | MZ | 100 | 100 | 490 | 0 | 19.9 | 1 |
| 36 | MZ | 100 | 100 | 490 | 0 | 20.5 | 0 |
| 37 | MZ | 100 | 150 | 400 | 0 | 16.4 | 1 |
| 38 | MZ | 150 | 100 | 460 | 0 | 9.1 | 0 |
| 39 | MZ | 150 | 100 | 460 | 0 | 80.2 | 0 |
| 40 | MZ | 150 | 100 | 460 | 0 | 22.1 | 0 |
| 41 | MZ | 150 | 100 | 460 | 0 | 22.1 | 0 |
| 42 | MZ | 250 | 50 | 460 | 50 | 31.2 | 0 |
| 43 | MZ | 250 | 50 | 460 | 50 | 29.3 | 0 |
| 44 | MZ | 250 | 100 | 400 | 0 | 19.4 | 1 |
| 45 | MZ | 250 | 100 | 400 | 0 | 19.3 | 1 |
| 46 | MZ | 250 | 100 | 430 | 0 | 19.4 | 1 |
| 47 | MZ | 250 | 100 | 430 | 0 | 19.6 | 1 |
| 48* | MZ | 250 | 100 | 460 | 0 | 12.7 | 0 |
| 49 | MZ | 250 | 100 | 460 | 0 | 12.9 | 0 |
| 50 | MZ | 250 | 100 | 460 | 0 | 13.3 | 0 |
| 51 | MZ | 250 | 100 | 460 | 0 | 13 | 0 |
| 52 | MZ | 250 | 100 | 490 | 0 | 18.8 | 0 |
| 53 | MZ | 250 | 100 | 490 | 0 | 21.5 | 0 |
| 54 | MZ | 250 | 150 | 400 | 0 | 15.6 | 1 |

*these experiments have also been performed with air wiping, instead of $N_2$, leading to the same sagging behaviour.

On some of the pilot line material, laser-welding tests have been performed and compared to commercial GI with the following parameters in Table 14:

TABLE 14 laser welding tests

| Coating type | Coating thickness | Sheet thickness |
|---|---|---|
| GI | 7-8 μm | 0.8 mm |
| MZ_trial2 | 7-8 μm | 0.7 mm |
| MZ_trial2 | 4-5 μm | 0.7 mm |

It is expected that laser welding will be used more in the future to connect steel parts in the automotive industry. In the conventional butt-welding configuration there is hardly an effect of the coating on the weldability, in the overlap configuration for laser welding however the presence of zinc has a big influence on the welding behaviour. During the welding process the zinc will melt and evaporate, the zinc vapour is trapped between the overlapping sheets. The build-up of vapour pressure between the sheets leads to blowouts of the melt pool, which results in (heavy) spatter. To prevent this, a spacer between the steel sheets at the weld can be used. However, in practice this will lead to higher costs. It is known that thin GI coatings lead to fewer problems than thick zinc coatings.

Three test materials were cut to rectangular samples of 250×125 mm in size (the long edge is in the rolling direction), these test coupons were placed in a welding jig and clamped firmly. An overlap length of 50 mm was used, this is a larger overlap than normally used in manufacturing but prevents that any edge effect influences the welding process. The clamping pressure was applied as close as possible to the welding zone (16 mm apart). The weld position was in the centre between the clamps. For the laser welding experiments a 4.5 kW Nd:YAG laser and a robot carried HighYag welding head was used producing a laser spot size of 00.45 mm (mono focus).

For the welding tests with spacer, strips of paper were used as the spacer to create a small gap of about 0.1 mm between the sheets. Samples of the three materials were welded with the spacers between the sheets with 4000 W of laser power at a welding speed of 5 in/min and without shielding gas. All these welds showed perfect weld bead appearance without any pores.

To quantify the weld appearance of the welds made without spacers the number of through thickness pores were counted. The number of these pores were assessed by examining transmission of light.

A low welding speed gives the best weld bead appearance with the least through thickness pores. The best results were achieved with the combination of a low welding speed of 2 m/min and a high laser power of 4000 W. At this setting the sample coated with the "thick" (7-8 μm) MZ_trial2 coating performed worse than the GI coated material with a similar coating thickness: 15 versus 7 through thickness pores per sample. At this setting the "thin" (4-5 μm) MZ_trial2 coated material performed slightly better than the GI coated material: 5 and 7 through thickness pores per sample, respectively.

These results can be summarized as follows: the coating thickness should be less than 7 μm and at least 3 μm (for corrosion resistance) to get a good laser weldability without spacer.

It will be appreciated that the coatings and the coating method can also be used for strip having a composition different from that used for the above experiments.

The invention claimed is:

1. A coated steel strip consisting of a steel strip provided with a coating of hot dip galvanized zinc alloy on the steel strip,
wherein the steel strip consists of steel,
wherein the zinc alloy consists of:
1.0-1.3 weight % magnesium;
1.6-1.9 weight % aluminium;
less than 0.0010 weight % of silicon;
<0.2 weight % Pb,
<0.2 weight % Sb,
<0.2 weight % Ti,
<0.2 weight % Ca,
<0.2 weight % Mn,
<0.2 weight % Sn,
<0.2 weight % La,
<0.2 weight % Ce,
<0.2 weight % Cr,
<0.2 weight % Ni,
<0.2 weight % Zr and
<0.2 weight % Bi;
unavoidable impurities;
the remainder being zinc;
wherein the zinc alloy coating layer has a thickness of 3-12 μm.

2. The coated steel strip according to claim 1, wherein a layer of the zinc alloy coating has a thickness of 3-10 μm.

3. The coated steel strip according to claim 1, wherein a layer of the zinc alloy coating has a thickness of 3-8 μm.

4. The coated steel strip according to claim 1, wherein a layer of the zinc alloy coating has a thickness of 3-7 μm.

5. The coated steel strip according to claim 4, wherein the amount of magnesium in the zinc alloy is 1.0-1.30 weight %.

6. The coated steel strip according to claim 1, consisting of the steel strip and a respective layer of the zinc alloy coating on opposed sides of the steel strip.

7. The coated steel strip according to claim 1, wherein in the zinc alloy coating there is
<0.1 weight % Pb,
<0.1 weight % Sb,
<0.1 weight % Ti,
<0.1 weight % Ca,
<0.1 weight % Mn,
<0.1 weight % Sn,
<0.1 weight % La,
<0.1 weight % Ce,
<0.1 weight % Cr,
<0.1 weight % Ni,
<0.1 weight % Zr and
<0.1 weight % Bi.

8. The coated steel strip according to claim 1, wherein the zinc alloy contains 1.77-1.9 weight % aluminium.

9. The coated steel strip according to claim 8, wherein the amount of magnesium in the zinc alloy is 1.0-1.2 weight %.

10. The coated steel strip according to claim 1, wherein the amount of magnesium in the zinc alloy is 1.0-1.2 weight %.

11. Automotive part manufactured from a coated steel strip according to claim 1.

12. The coated steel strip according to claim 1, wherein the amount of magnesium in the zinc alloy is 1.0-1.30 weight %.

13. A coated steel strip consisting of a steel strip provided with a coating of hot dip galvanized zinc alloy on the steel strip,
wherein the steel strip consists of steel,
wherein the zinc alloy consists of:
1.0-1.2 weight % magnesium;
1.6-2.3 weight % aluminium;
less than 0.0010 weight % of silicon;
<0.2 weight % Pb,
<0.2 weight % Sb,
<0.2 weight % Ti,
<0.2 weight % Ca,
<0.2 weight % Mn,
<0.2 weight % Sn,
<0.2 weight % La,
<0.2 weight % Ce,
<0.2 weight % Cr,
<0.2 weight % Ni,
<0.2 weight % Zr and
<0.2 weight % Bi;
unavoidable impurities;
the remainder being zinc;
wherein the zinc alloy coating layer has a thickness of 3-12 μm.

14. The coated steel strip according to claim 13, wherein a layer of the zinc alloy coating has a thickness of 3-10 μm.

15. The coated steel strip according to claim 13, wherein a layer of the zinc alloy coating has a thickness of 3-8 μm.

16. The coated steel strip according to claim 13, wherein a layer of the zinc alloy coating has a thickness of 3-7 μm.

17. The coated steel strip according to claim 13, consisting of the steel strip and a respective layer of the zinc alloy coating on opposed sides of the steel strip.

18. The coated steel strip according to claim 13, wherein in the zinc alloy coating there is
<0.1 weight % Pb,
<0.1 weight % Sb,
<0.1 weight % Ti,
<0.1 weight % Ca,
<0.1 weight % Mn,
<0.1 weight % Sn,
<0.1 weight % La,
<0.1 weight % Ce,
<0.1 weight % Cr,
<0.1 weight % Ni,
<0.1 weight % Zr and
<0.1 weight % Bi.

19. The coated steel strip according to claim 13, wherein the zinc alloy contains 1.77-2.3 weight % aluminium.

20. Automotive part manufactured from a coated steel strip according to claim 13.

* * * * *